United States Patent

Schell et al.

[11] Patent Number: 5,804,360
[45] Date of Patent: Sep. 8, 1998

[54] IMAGING ELEMENT AND AQUEOUS COATING COMPOSITIONS CONTAINING POLYURETHANE/VINYL POLYMER DISPERSIONS

[75] Inventors: Brian A. Schell, Honeoye Falls; Charles C. Anderson, Penfield; Kenneth L. Tingler, Rochester; Yongcai Wang, Penfield, all of N.Y.

[73] Assignee: Eastman Kodak Company, Rochester, N.Y.

[21] Appl. No.: 854,572

[22] Filed: May 12, 1997

[51] Int. Cl.[6] .............................. G03C 1/795; G03C 1/89; G03C 1/93
[52] U.S. Cl. ..................... 430/535; 430/215; 430/263; 430/527; 430/531; 430/534; 430/536; 430/539; 430/961
[58] Field of Search ..................................... 430/531, 534, 430/536, 961, 539, 527, 263, 215, 535

[56] References Cited

U.S. PATENT DOCUMENTS

| | | | |
|---|---|---|---|
| 4,497,917 | 2/1985 | Upson et al. | 430/536 |
| 4,644,030 | 2/1987 | Loewrigkeit et al. | 524/457 |
| 4,880,867 | 11/1989 | Gobel et al. | 524/507 |
| 4,927,876 | 5/1990 | Coogan et al. | 524/501 |
| 4,934,559 | 6/1990 | Putnam | 34/108 |
| 5,006,413 | 4/1991 | Den Hartog et al. | 428/463 |
| 5,006,451 | 4/1991 | Anderson et al. | 430/527 |
| 5,204,404 | 4/1993 | Werner et al. | 524/501 |
| 5,314,942 | 5/1994 | Coogan et al. | 524/457 |
| 5,366,855 | 11/1994 | Anderson et al. | 430/527 |
| 5,371,133 | 12/1994 | Stanley | 524/457 |
| 5,447,832 | 9/1995 | Wang et al. | 430/527 |
| 5,695,920 | 12/1997 | Anderson et al. | 430/531 |

*Primary Examiner*—Richard L. Schilling
*Attorney, Agent, or Firm*—Carl F. Ruoff

[57] ABSTRACT

The present invention is an imaging element including a support, an image-forming layer and at one least layer having been formed by the coating and subsequent drying of a coating composition. The coating composition is an aqueous medium having therein a polyurethane/vinyl polymer dispersion formed by free radical polymerization of a vinyl monomer in the presence of an aqueous polyurethane dispersion.

8 Claims, No Drawings

IMAGING ELEMENT AND AQUEOUS COATING COMPOSITIONS CONTAINING POLYURETHANE/VINYL POLYMER DISPERSIONS

FIELD OF THE INVENTION

This invention relates in general to imaging elements, and in particular to imaging elements comprising a support material containing at least one layer coated from an aqueous coating solution having therein a polyurethane/vinyl polymer dispersion. The polyurethane/vinyl polymer dispersion is formed by free radical polymerization of one or more vinyl monomers in the presence of an aqueous polyurethane dispersion. The invention provides coating compositions that have improved manufacturing and film forming characteristics. In addition, coatings of the present invention provide a reduction in the amount of volatile organic compounds emitted during the drying process, and are, therefore, more attractive from an environmental standpoint.

BACKGROUND OF THE INVENTION

Support materials for an imaging element often employ layers comprising glassy, hydrophobic polymers such as polyacrylates, polymethacrylates, polystyrenes, or cellulose esters, for example. One typical application for such a layer is as a backing layer to provide resistance to scratches, abrasion, blocking, and ferrotyping. The latter two properties relate to the propensity of layers applied onto the support material or imaging element to stick together as a result of the adverse humidity, temperature, and pressure conditions that may occur during the manufacture and use of the imaging element.

These glassy polymers are typically coated from organic solvent-based solutions to yield a continuous film upon evaporation of the solvent. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 50° C. Typically these polymers are used in priming or "subbing" layers which are applied onto the film support to act as adhesion promoting layers for photographic emulsion layers. Such low Tg polymers, although useful when they underlay an emulsion layer, are not suitable as, for example, backing layers since their blocking and ferrotyping resistance are poor. To fully coalesce a polymer latex which has a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (Journal of Applied Polymer Science, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25° to 60° C.

Aqueous coating compositions containing a binder material comprising a mixture of 90 to 40 weight % of acrylic latex containing hydroxyl groups, 10 to 60 weight % polyurethane dispersion, and pigments useful as a top coat for automobiles are described in U.S. Pat. No. 4,880,867. U.S. Pat. Nos. 4,954,559 and 5,006,413 describe aqueous coating compositions for automobile finishes containing 10 to 30 weight % solids that comprise 60 to 90 weight % of methylol(meth)acrylamide acrylic polymer latex having a Tg of −40° to 40° C. and 10 to 40 weight % of a polyurethane dispersion. The use of these compositions in imaging applications is not disclosed.

U.S. Pat. No. 5,204,404 describes a water-based coating composition containing a mixture of a dispersed acrylic silane polymer and a polyurethane. The acrylic silane polymer is prepared by emulsion polymerization and contains 1 to 10% of silane containing acrylates, 0.1 to 10% of carboxylic acid containing monomer, and 2 to 10% of hydroxyl containing monomer. The polymer has a Tg of from −40° to 25° C. and a molecular weight of from 500,000 to 3,000,000.

U.S. Pat. Nos. 4,644,030, 4,927,876, 5,314,942, and 5,371,133 describe polyurethane/vinyl polymer aqueous dispersions formed by free radical polymerization of one or more vinyl monomers in the presence of an aqueous polyurethane dispersion. The use of such materials in imaging applications is not disclosed.

There are several differences in designing aqueous coating compositions for imaging applications from those for paint and automobile finishes. One difference is in the drying time cycle. Long drying time cycles can insure that polymer particles contained in a coating composition have sufficient time to pack and deform to from a continuous, void-free film. In interior and exterior paint applications the drying time is of the order of hours or days. In automobile finish applications the drying time lasts at least 10 to 30 minutes. However, in imaging element manufacture the drying time for coatings is typically less than one minute. Often the drying time is as brief as 30 seconds. Therefore, an aqueous coating composition which is effective for paint and automobile finish applications may not be suitable for imaging applications. Under the temperatures and, especially, the residence times employed during the coating and drying of coatings on photographic films, polymer particles with Tg as low as 30° C. may require the addition of high boiling point organic solvent coalescing aids to promote the formation of void-free, continuous films as described in U.S. Pat. No. 5,006,451.

Coatings for imaging applications must provide physical and chemical properties such as abrasion resistance and impermeability to aqueous film processing solutions using extremely thin layers. Typically these layers are less than 1 micron in thickness. Thus film formation and film quality are especially critical. In addition, coating compositions for photographic film applications must not adversely affect the sensitometric response or reduce the transparency of the processed film.

U.S. Pat. Nos. 5,447,832 and 5,366,855 describe for imaging elements a coalesced layer comprising a mixture of film-forming colloidal polymer particles, including polyurethane dispersions, and non-film forming colloidal polymer particles. Those layers are coated from aqueous medium and contain polymer particles of both high and low glass transition temperatures. Typically, the film forming colloidal polymer particles consist of low Tg polymers, and are present in the coated layers from 20 to 70 percent by weight.

In recent years, the conditions under which imaging elements are manufactured and utilized have become even more severe. This is either because applications for imaging elements have been extended to more severe environments or conditions, for example, higher temperatures must be withstood during manufacturing, storage, and use, or because manufacturing and processing speeds have been increased for greater productivity. Under these conditions, the above mentioned methods to obtain aqueous coating compositions free of organic solvents become deficient with regard to simultaneously satisfying all of the physical, chemical, and manufacturing requirements for an aqueous coating for imaging applications. For example, the image elements are more severely scratched during high speed finishing processes. A foremost objective of the present invention is therefore to provide an aqueous coating composition which is essentially free of organic solvent, has excellent film forming characteristics under drying conditions used for imaging support manufacturing processes, and forms a dried layer with excellent resistance to physical scratch and abrasion, and to sticking and ferrotyping even at high temperatures.

SUMMARY OF THE INVENTION

The present invention is an imaging element including a support, an image-forming layer and at least layer having been formed by the coating and subsequent drying of a coating composition. The coating composition is an aqueous medium having therein a polyurethane/vinyl polymer dispersion formed by free radical polymerization of a vinyl monomer in the presence of an aqueous polyurethane dispersion.

DETAILED DESCRIPTION OF THE PREFERRED EMBODIMENTS

The imaging elements to which this invention relates can be any of many different types depending on the particular use for which they are intended. Such elements include, for example, photographic, electrostatographic, photothermographic, migration, electrothermographic, dielectric recording, and thermal dye transfer imaging elements.

The imaging elements in accordance with this invention can comprise various polymeric films, papers, glass, and the like, but both acetate and polyester supports well known in the art are preferred. The thickness of the support is not critical. Support thicknesses of 2 to 10 mil (0.002 to 0.010 inches) can be used. The supports typically employ an undercoat or subbing layer well known in the art that comprises, for example, for polyester support a vinylidene chloride/methyl acrylate/itaconic acid terpolymer or vinylidene chloride/acrylonitrile/acrylic acid terpolymer. The layers of this invention can be employed as subbing layers, interlayers, overcoat layers, backing layers, receiving layers, barrier layers, timing layers, antihalation layers, antistaticlayers, stripping layers, transparent magnetic layers, protective overcoats for antistatic layers, and the like. The layers in accordance with this invention are particularly advantageous due to superior physical properties including exceptional transparency and toughness necessary for providing resistance to scratches, abrasion, blocking, and ferrotyping.

Coating compositions for forming the layers in accordance with the present invention comprise a continuous aqueous phase having therein a polyurethane/vinyl polymer dispersion. The polyurethane/vinyl polymer dispersion is formed by free radical polymerization of one or more vinyl monomers in the presence of an aqueous polyurethane dispersion. Other additional compounds may be added to the coating composition, depending on the functions of the particular layer, including surfactants, emulsifiers, coating aids, matte particles, rheology modifiers, crosslinking agents, inorganic fillers such as conductive and nonconductive metal oxide particles, pigments, magnetic particles, biocide, and the like. The coating composition may also include a small amount of organic solvent, preferably the concentration of organic solvent is less than 1 percent by weight of the total coating composition.

The polyurethane/vinyl polymer dispersion is formed by free radical polymerization of one or more vinyl monomers in the presence of an aqueous polyurethane dispersion. Dispersions prepared by this process differ from blends obtained by simply mixing separate dispersions of the component polyurethane and vinyl polymer in that the elementary particles of the dispersion contain both urethane and vinyl polymer.

Aqueous polyurethane dispersions are well known and are prepared by chain extending a prepolymer containing terminal isocyanate groups with an active hydrogen compound, usually a diamine or diol. The prepolymer is formed by reacting a diol or polyol such as a polyester, polyether, polycarbonate, or polyacrylate having terminal hydroxyl groups with excess diisocyanate or polyisocyanate. To permit dispersion in water, the prepolymer is functionalized with hydrophilic groups. Anionic, cationic, or nonionically stabilized prepolymers can be prepared. Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alklating agent or acid. Nonionically stabilized prepolymers can be prepared by the use of diol or diisocyanate co-monomers bearing pendant polyethylene oxide chains. These result in polyurethanes with stability over a wide range of pH. Nonionic and anionic groups may be combined synergistically to yield "universal" urethane dispersions. Of the above, anionic polyurethanes are by far the most significant.

One of several different techniques may be used to prepare urethane dispersions. For example, the prepolymer may be formed, neutralized or alkylated if appropriate, then chain extended in an excess of organic solvent such as acetone or tetrahydrofuran. The polyurethane solution is then diluted with water and the solvent removed by distillation. This is known as the "acetone" process. Alternatively, a low molecular weight prepolymer can be prepared— usually in the presence of a small amount of solvent to reduce viscosity—and chain extended with diamine just after the prepolymer is dispersed into water. The latter is termed the "prepolymer mixing" process and for economic reasons is much preferred over the former.

Polyols useful for the preparation of the dispersions of the present invention include polyester polyols prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersability are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, amnioethylethanolamine and the like.

Solvents which may be employed to aid in formation of the prepolymer and to lower its viscosity and enhance water dispersibility include methylethylketone, toluene, tetrahydofuran, acetone, dimethylformamide, N-methylpyrrolidone, and the like. Water-miscible solvents like N-methylpyrrolidone are much preferred.

The polyurethane/vinyl polymer dispersions of the present invention are prepared in an analogous manner to conventional polyurethane dispersions excepting that vinyl monomer is introduced into the process and later subjected to a free radical polymerization. The vinyl monomer may be added at several different points in that process, and depending upon which method is employed, a different particle morphology yielding varying final film properties may result. For instance, the vinyl monomer may be used to replace all or part of the solvent used to prepare the prepolymer, with obvious environmental advantages. Vinyl monomer may also be introduced to the prepolymer just after its formation; in both of these cases the monomer is present during the dispersion step. Alternatively, the vinyl monomer may be added after the dispersion step. Combinations of the above may also be employed; however in all of the above free radical polymerization of the vinyl monomer is conducted in the presence of the polyurethane, resulting in some degree of interpenetration of the component polymers. The presence of the hydrophilic groups in the polyurethane backbone eliminate the need for surfactant in the polymerization of the vinyl monomer, with the added advantage that water sensitivity is greatly reduced, though surfactants may still be employed if desired.

Free radical polymerization of the vinyl monomer may be performed in a batch, semicontinuous, or multishot manner, depending upon which method is employed to form the urethane prepolymer. For example, in the case of a prepolymer formed in the presence of vinyl monomer, the initial monomer could be polymerized in a batch process after dispersion in water, followed by a second addition of monomer polymerized in a semicontinuous manner. Alternatively, the second addition could be performed in a single shot and polymerized batchwise. For vinyl monomer introduced to a preformed polyurethane dispersion, the entire process could be conducted semicontinuously until the desired ratio of polyurethane to vinyl polymer is reached. This ratio will also influence final film properties; the useful ratio of vinyl polymer to polyurethane is from 1:9 to 9:1, most preferred from 3:7 to 7:3.

Suitable vinyl monomers which may be employed include ethylenically unsaturated hydrocarbons, esters and ethers, particularly esters and ethers of acrylic and methacrylic acid. Specific examples include acrylic acid, methacrylic acid, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene, styrenecarboxylic acid, and vinyl toluene, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, dialkyl maleates, dialkyl itaconates, dialkyl methylene-malonates, isoprene, and butadiene. The free acids may not be employed unless the dispersion contains nonionic stabilizing groups conferring low pH stability.

Crosslinking comonomers can be used to lightly crosslink the polymer particles. It is preferred to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, esters of saturated glycols or diols with unsaturated monocarboxylic acids, such as ethylene glycol diacrylate, ethylene glycol dimethacrylate, 1,4-butanediol dimethacrylate, 1,3-butanediol dimethacrylate, and polyfunctional aromatic compounds such as divinyl benzene.

The emulsion polymerization process is well-known in the art (see, for example, Padget, J. C. in *Journal of Coating Technology*, Vol 66, No. 839, pages 89–105, 1994; El-Aasser, M. S. and Fitch, R. M. Ed. *Future Directions in Polymer Colloids*, NATO ASI Series, No 138, Martinus Nijhoff Publishers, 1987; Arshady, R. *Colloid & Polymer Science*, 1992, No 270, pages 717–732; Odian, G. *Principles of Polymerization*, 2nd Ed. Wiley (1981); and Sorenson, W.

P. and Campbell, T. W. *Preparation Method of Polymer Chemistry,* 2nd Ed, Wiley (1968)). The polymerization process is initiated with free radical initiators. Free radicals of any sort can be used. Preferred initiators include persulfates (such as ammonium persulfate, potassium persulfate, etc., peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodium hydrogen sulfate, etc.). Common chain transfer agents or mixtures thereof known in the art, such as alkyl-mercaptans, can be used to control the polymer molecular weight Surfactants which can be used include, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition".

The coating composition in accordance with the invention may also contain suitable crosslinking agents which can react with carboxylic acid groups including epoxy compounds, polyfunctional aziridines, methoxyalkyl melamines, triazines, polyisocyanates, carbodiimides, and the like.

Matte particles well known in the art may also be used in the coating composition of the invention, such matting agents have been described in Research Disclosure No. 308119, published December 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc disclosed in U.S. Pat. Nos. 2,454,043, 2,732,305, 2,976,148, 3,206,311, 3,933,516, 2,588,765, 3,121,060, 3,502,473, 3,042,222, and 4,427,964, in British Patent Nos. 1,263,722, 1,198,387, 1,430,997, 1,466,304, 1,320,757, 1,320,565, and 1,320,756, and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly (tetrafluoroethlyene), poly(trifluorochloroethylene), poly (vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in Research Disclosure No. 308119, published December 1989, page 1006.

The coating composition of the invention can be applied by any of a number of well-know techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published December 1989, pages 1007 to 1008.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly (vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention will now be described in detail with reference to examples; however, the present invention should not be limited to these examples.

The examples demonstrate the benefits of the aqueous coating compositions of the present invention, and in particular show that the coating compositions of the present invention have excellent film-forming characteristics under drying conditions typically used in the photographic support manufacturing process. The coated layer exhibits superior physical properties including exceptional transparency and exceptional toughness necessary for providing resistance to scratches, abrasion, blocking, and ferrotyping.

EXAMPLES

Preparation of Polyurethane/Vinyl Polymer Dispersion

A. Preparation of Polyurethane Dispersion

The ingredients below were introduced to a dry 3-neck, round-bottom flask fitted with nitrogen inlet, condenser, and overhead stirrer under a stream of dry nitrogen:

| | |
|---|---|
| N-methylpyrrolidone | 66 g |
| Polycaprolactonediol (OH#210) | 104.9 g |
| Dimethylolpropionic acid | 15.06 g |
| bis-(4-isocyanatocyclohexyl)methane | 92.5 g |

The flask was immersed in an oil bath and heated to 80° C. for 4 hours, at which time an increase in viscosity was noted. A drop of dibutyl tin dilaurate was added and the mixture was heated for an additional 2 hours before cooling to 50° C. 11.3 g of triethylamine was then added to neutralize the prepolymer, and the contents stirred for 20 minutes. The neutralized prepolymer was then poured into 445 g of distilled water with vigorous stirring, and immediately chain extended with 2.69 g of ethylenediamine. The product was a translucent dispersion with a mean particle size, as determined by light scattering, of 55 nm.

B. Preparation of Polyurethane/Vinyl Polymer Dispersion

To a 3-neck flask equipped as above were added 150 g of the polyurethane dispersion and 105 g of distilled water. The contents were sparged with nitrogen, then placed in a constant temperature bath and heated to 73° C. 0.225 g of potassium persulfate was added, and 45 g of methyl methacrylate was added dropwise to the stirred contents over a 45 minute period. The flask was heated for another 3 hours, then cooled to room temperature and filtered. Very little sediment was observed during filtration. The final product had a mean particle size of 66 nm and solids of 34%. This polymer is designated P-1 in the following examples.

A commercially available polyurethane/vinyl polymer dispersion was also used to prepare coatings of the invention, this material is Witcobond A100 (Witco Corp.), designated as P-2 in the examples. This material is free of N-methyl pyrrolidone, which is a solvent typically present in conventional polyurethane dispersions and coating compositions employing physical mixtures of polyurethane dispersions and vinyl latex polymers such as those taught in U.S Pat. Nos. 5,447,832 and 5,366,855.

Examples 1 and 2

Backing layer coating compositions comprising the polyurethane/vinyl polymer dispersions and 10 weight % (based on polymer weight) of an aziridine crosslinking agent (CX100, Zeneca Resins Inc.) were applied at 4% solids onto a polyester film support that had been previously coated with a Ag-doped vanadium pentoxide containing antistatic layer. The backing latyers were applied at a dry coating weight of 1000 mg/m$^2$.

The permanence of the antistatic properties and, therefore, the impermeability of the backing layer was determined by comparing the internal resistivity (using the salt bridge method, described in R. A. Elder, "Resistivity Measurements on Buried Conductive Layers", EOS/ESD Symposium Proceedings, September 1990, pages 251–254.254.) for the samples at 20% relative humidity before and after film processing in a Graphic Arts film processor. Taber abrasion resistance for the samples was determined by the procedures set forth in ASTM D1044. The results for the coatings are given in Table 1.

TABLE 1

| Coating | Polymer | Taber abrasion, % abraded haze | Resistivity before processing, log Ω/□ | Resistivity after processing, log Ω/□ |
|---------|---------|-------------------------------|----------------------------------------|---------------------------------------|
| Example 1 | P-1 | 16.7 | 6.9 | 6.9 |
| Example 2 | P-2 | 14.0 | 7.0 | 7.0 |

The invention has been described in detail with particular reference to certain preferred embodiments thereof, but it will be understood that variations and modifications can be effected within the spirit and scope of the invention.

What is claimed is:

1. An imaging element comprising a support, an image-forming layer and at least one layer having been formed by coating and subsequent drying of a coating composition comprising an aqueous medium having therein a polyurethane/vinyl polymer dispersion formed by free radical polymerization of a vinyl monomer in the presence of an aqueous polyurethane dispersion.

2. The imaging element of claim 1, wherein the support comprises polymeric film, paper, and glass.

3. The imaging element of claim 1, wherein the support has a thickness of from of 2 to 10 mil (0.002 to 0.010 inches).

4. The imaging element of claim 1, wherein the support comprises polyester.

5. The imaging element of claim 4, further comprising an undercoat or subbing layer of vinylidene chloride/methyl acrylate/itaconic acid terpolymer or vinylidene chloride/acrylonitrile/acrylic acid terpolymer.

6. The imaging element of claim 1, wherein the coating composition further comprises surfactants, emulsifiers, coating aids, matte particles, rheology modifiers, crosslinking agents, inorganic fillers, pigments, magnetic particles, or biocides.

7. The imaging element of claim 1, wherein the vinyl monomer is selected from the group consisting of acrylic acid, methacrylic acid, alkyl esters of acrylic acid, alkyl esters of methacrylic acid, nitrites of acrylic acid, nitriles of methacrylic acid, amides of acrylic acid, amides of methacrylic acid, vinyl acetate, vinyl propionate, vinylidene chloride, vinyl chloride, styrene, t-butyl styrene, styrenecarboxylic acid, vinyl toluene, itaconic acid, maleic acid, fumaric acid, monoalkyl itaconates, monoalkyl maleates, citraconic acid, dialkyl maleates, dialkyl itaconates, dialkyl methylene-malonates, isoprene, and butadiene.

8. The imaging element of claim 1, wherein the coating composition further comprises crosslinking agents.

* * * * *